United States Patent [19]

Nice

[11] Patent Number: 4,862,750

[45] Date of Patent: Sep. 5, 1989

[54] VORTEX SHEDDING FLUID VELOCITY METER

[76] Inventor: Gerald J. Nice, 34 Princeton Dr., Manalapan, N.J. 07726

[21] Appl. No.: 13,324

[22] Filed: Feb. 11, 1987

[51] Int. Cl.⁴ ............................................. G01F 1/32
[52] U.S. Cl. ............................ 73/861.24; 73/DIG. 4
[58] Field of Search .......... 73/861.22, 861.24, DIG. 4

[56] References Cited

U.S. PATENT DOCUMENTS

| | | | |
|---|---|---|---|
| Re. 31,217 | 4/1983 | Rodely | 73/861.22 |
| 3,719,073 | 6/1973 | Mahon | 73/861.22 |
| 3,737,897 | 5/1973 | Herzl . | |
| 3,972,232 | 8/1976 | Miller et al. | 73/861.24 |
| 4,116,059 | 9/1978 | Herzl . | |
| 4,464,939 | 8/1984 | Corpron | 73/861.24 |
| 4,526,040 | 7/1985 | Matsubara | 73/861.24 |
| 4,559,832 | 12/1985 | Burlage | 73/861.24 |

OTHER PUBLICATIONS

Piezo Electric Vortex Flow Transmitter—Nice Instrumentation.

*Primary Examiner*—Herbert Goldstein
*Attorney, Agent, or Firm*—Lerner, David, Littenberg, Krumholz & Mentlik

[57] ABSTRACT

A vortex-shedding flowmeter having two independent force sensors disposed on opposite sides of a tailpiece downstream from the vortex generating element for detecting fluid pressures. The signals derived from the two sensors are merged to form a composite output signal so as to cancel spurious signals caused by fluid pulsations or noise. One or both sensors may be provided with an adjustable gain element to compensate for differences in sensitivity.

22 Claims, 2 Drawing Sheets

VORTEX SHEDDING FLUID VELOCITY METER

BACKGROUND OF THE INVENTION

The present invention relates to vortex shedding fluid velocity meters.

Fluid flowing past a blunt, non-streamlined obstruction tends to develop vortices at the obstruction. These vortices are detached or "shed" from the obstruction and passed downstream with the fluid flow. In a phenomenon referred to as a "von Karman vortex street," the vortices tend to pass downstream from the obstruction in rows on opposite sides of the obstruction. The vortices in such a vortex street tend to be spaced at predetermined intervals, with the vortices of one row staggered with respect to the vortices in the other row. The distance between adjacent vortices in each row is substantially constant over a fairly wide range of flow rates. Therefore, the number of vortices passing a point downstream from the obstruction per unit time is substantially proportional to the velocity of the flowing fluid and hence proportional to the flow rate. As disclosed in U.S. Pat. No. 3,572,117, it has long been recognized that a flowmeter can be made by providing an appropriate vortex generating obstruction and sensing elements downstream from the obstruction to detect the vortices. The sensors described in the '117 patent detect the localized disturbance in the flow created by each vortex as that vortex passes the sensor.

As the apparatus required for direct measurement of localized flow disturbances is relatively delicate and troublesome, other vortex shedding flowmeters have made with pressure sensors. As described in U.S. Pat. No. 3,972,232, a vortex shedding flowmeter may have a vortex generating obstruction in the form of a generally flat plate, and a barlike tailpiece may be joined to the rear or downstream surface of the plate so that the tailpiece projects downstream from the rear or downstream surface of the plate. The vortices shed alternately from the opposite edges of the plate pass downstream on opposite sides of the tailpiece, and hence create slight disturbances in the fluid pressure on each side of the plate. Because the vortices shed from opposite edges of the plate are staggered with respect one another, they will produce alternating pressure fluctuations on opposite sides of the tailpiece. For any given sensing location along the tailpiece, the pressure at the sensing location will be slightly increased on one side of the tailpiece and slightly depressed on the opposite side of the tailpiece as a vortex passes by the sensing location on one side. When the vortex passes along the other side, the pattern of pressure increase and decrease is reversed. As set forth in the '232 patent, a differential pressure sensor may be mounted to the tailpiece in a predetermined sensing location slightly downstream from the vortex generating element or plate. The sensor taught in the '232 patent includes a laminated, two-layer piezoelectric assembly mounted in a hole passing through the tailpiece from side to side so that the piezoelectric assembly is exposed to fluid pressures on both sides and hence deforms as a unit responsive to differences between the pressures prevailing on opposite sides of the tailpiece. To isolate the piezoelectric element from the flowing fluid, flexible diaphragms cover the hole on both sides, and the spaces between the diaphragms and the piezoelectric element are filled with an inert fluid such as an oil.

The two-layer piezoelectric element is provided with a single set of leads so that one electrical potential across the piezoelectric assembly can be transmitted to an external signal processing circuit. As the piezoelectric assembly bends back and forth as a unit under the influence of the alternating high and low pressures on opposite sides of the tailpiece, the potential of the output signal at the leads varies. The frequency of this variation in theory represents the frequency with which vortices pass the sensing element. Thus, by amplifying this output signal and measuring its frequency, the fluid velocity and hence flow rate can be monitored. In practice, however, the output signal from the piezoelectric assembly contains many spurious fluctuations. These spurious fluctuations can be of about the same magnitude as the periodic variations representing vortex passage. Therefore, the spurious fluctuations can interfere with the frequency measurements and produce substantial error in the velocity or flow readings. Elaborate electronic filtering arrangements have been applied to the output signal from the piezoelectric assembly to counteract these spurious fluctuations. However, even with such arrangements, it is sometimes difficult or impossible to obtain a reliable measurement. This problem is particularly troublesome where the flowmeter is mounted in a noisy environment such as a typical pipeline connected to a pump. Noise created by the pump and propagated through the fluid and through walls of the pipe tends to aggravate the spurious fluctuations in the output signal.

Another serious problem in vortex shedding flowmeters heretofore has been the problem of frequency variation. Thus, the time between shedding of successive vortices tends to vary about a nominal or central value. This causes variations in the frequency of the output signal from the flowmeter. As the nominal frequency or period of the output signal varies about its nominal or central value, it falsely indicates that the fluid flow rate or velocity is also varying. This variation in the frequency or period of the output signal is particularly troublesome where the output signal is fed to an automatic control system or computer.

Accordingly, there have been substantial needs heretofore for improvements in vortex shedding flow meters.

SUMMARY OF THE INVENTION

The present invention addresses those needs.

One aspect of the present invention provides a fluid velocity meter which includes a vortex generating element defining a forward face and a pair of lateral edges bounding the forward face. Preferably, the vortex generating element is a substantially flat, platelike element having two oppositely directed major surfaces, one of which defines the forward face of the element. A tailpiece preferably is disposed rearwardly of the vortex generating element, the tailpiece having two opposite side surfaces facing generally in opposite lateral directions. Preferably, the tailpiece projects rearwardly from the rearward major surface of the vortex generating element, so that the tailpiece and vortex generating element cooperatively define a T-shaped body.

According to this preferred aspect of the invention, two separate, independently operable, force sensors are provided. Output means are associated with each such sensor for producing a sensor output signal representing the force applied to the sensor. Each force sensor preferably includes a deformable element and produces an output related to deformation of the deformable element. Mounting means are provided for mounting the sensors to the tailpiece so that the sensors can operate substantially independently of one another and so that fluid pressures applied to the side surfaces of the tailpiece apply forces to the sensors in opposite lateral directions. Typically, each sensor is a platelike piezoelectric element having opposed major faces and each piezoelectric element is mounted to one of the side surfaces of the tailpiece so that fluid pressure on the side surface urges the element inwardly, towards the interior of the tailpiece.

The output means associated with each sensor most preferably delivers a separate sensor output signal representing the force applied to that sensor. According to one aspect of the invention, the flowmeter may be provided with appropriate means, such as appropriate electrical conductors, for providing these two separate sensor output signals to an external signal processing apparatus. According to a further aspect of the invention, signal processing means are provided for merging the sensor output signals from the output means to form a composite output signal. The merging arrangement most preferably is selected so that changes in sensor output signals corresponding to forces applied to the sensors in the same lateral direction will reinforce one another and alter the composite output signal but changes in the sensor output signals corresponding to forces applied to the sensors in opposite lateral directions will oppose one another to thereby minimize alteration of the composite output signal.

As genuine vortices tend to produce alternating elevated and diminished pressures on opposite sides of the tailpiece, the vortices will apply forces to both sensors in the same lateral direction, tending to displace both sensors towards one side of the tailpiece. When a vortex passes on one side of the tailpiece, the pressure on one side is momentarily elevated whereas the pressure on the other side is momentarily diminished, so that both sensors are momentarily urged towards the side with diminished pressure, and the changes in the sensor output signals tend to reinforce one another. Therefore, the composite output signal will oscillate as the vortices pass on opposite sides of the tailpiece. By contrast, pulsations in the general fluid pressure prevailing around the instrument will tend to bow both of the sensors inwardly, towards the medial plane of the tailpiece, thereby urging the sensors in opposite lateral directions. The variations in sensor output signals produced by such pressure fluctuations will tend to cancel one another.

In a sense, the dual sensors and signal processing means provides a composite output representing the differences in fluid pressure between the two side surfaces of the tailpiece. However, the dual sensor arrangement provides a marked and unexpected superiority vis a vis arrangements as set forth in the '232 patent, in which a single sensor assembly is employed to monitor differential pressure. The dual sensor arrangements according to this aspect of the present invention are remarkably unresponsive to noise as, for example, mechanical noises propagated through the pipeline and into the meter. Although the present invention is not limited by any theory of operation, it is believed that most mechanical noise tends to cause vibrations of substantially equal amplitude but opposite phase within the sensors. Thus, inertial effects caused by noise tend to deform the sensors in opposite directions. Accordingly, the changes in sensor output signals caused by noise tend to cancel one another.

Regardless of the actual mechanism or theory of operation, it has been found that flowmeters according to this aspect of the present invention can provide a composite output signal with a high signal to noise ratio. As used in this disclosure with reference to an output signal of a vortex shedding flowmeter, the term "signal to noise ratio" refers to the ratio between the amplitude of variations in the output signal caused by vortices to the amplitude of spurious fluctuations in the output signal, such as those caused by mechanical noise or the like. The high signal to noise ratio provided by flowmeters according to this aspect of the present invention greatly simplifies signal processing. Moreover, the noise immunity afforded by this aspect of the present invention permits use of vortex shedding flowmeters in noisy systems where such flowmeters have previously been regarded as unsuitable, and also greatly enhances the reliability of the systems wherever used.

According to a further aspect of the present invention, the signal processing means may include variable gain means for applying a selectively variable gain to at least one of the sensor output signals prior to merger of the sensor output signals. As utilized in the present disclosure, the term "gain" is used in its broadest sense, as including both positive gain or negative gain, also referred to as attenuation. By varying the gain applied to one or both of the separate sensor output signals, it is possible to compensate for factors such as differences in sensitivity between the sensors and/or misalignment of the vortex generating element and tailpiece with the flow. Where the tailpiece is misaligned slightly or where one of the sensors is more responsive than the other, the composite output will vary in response to pressure pulsations despite the opposing effect of the two sensors. By adjusting the gain applied to one or both sensor outputs, this condition can be corrected. By contrast, the vortex shedding flowmeters of the prior art have required the utmost care in alignment of their elements with the flow field to avoid unwanted variations in output in response to fluid pressure pulsations rather than vortices.

Further aspects of the present invention provide improved geometries for a T-shaped body in a vortex shedding flowmeter. The body preferably includes a flat, platelike element with oppositely-directed front and rear major faces and lateral minor faces extending between these major faces. The edges defining the bounds of the front surface on the body may be the edges defined by the junctures of the lateral minor faces with the front major face of the platelike element. The lateral minor faces of the platelike element may be substantially perpendicular to the front face and hence substantially parallel to one another. By contrast, many of the vortex generating elements utilized heretofore have had tapering minor sides defining acute angles with the front face. According to this aspect of the present invention, it has been found that parallel minor faces tend to provide more repeatable vortex shedding action so that the frequency and/or period between successive vortices is more regular. This tends to alleviate the problem of frequency variation adverted to above.

Moreover, the length or rearward extent of the body, and the sensor placement, preferably are optimized according to this aspect of the present invention to suppress frequency variation even further. The rearward extent of the tailpiece, from the edges of the forward face on the vortex generating element, desirably is at least about one times, and preferably about two to about three times the lateral distance between the edges of the vortex generating element. Each sensor preferably is exposed to fluid pressure applied to predetermined sensing areas on the side surface of the tailpiece. The rearward distance from the edges of the forward face on the vortex generating element to the centers of the sensing areas preferably is about one to about three times, and most preferably about 1.2 times the lateral distance between the edges on the forward face of the vortex generating element. Also, the tailpiece preferably is tapered so that side surfaces of the tailpiece slope toward one another in the rearward direction. All of these factors tend to reduce frequency variation and fluid noise. It is particularly desirable to combine these features with the dual sensor arrangement adverted to above. The high signal to noise ratio afforded by the dual sensor arrangement permits the use of high amplification if desired and hence provides optimum results despite any minor loss of signal amplitude occasioned by the other features.

These and other objects, features and advantages of the present invention will be more readily apparent from the detailed description of the preferred embodiments set forth below, taken in conjunction with the accompanying drawings.

DETAILED DESCRIPTION OF THE PREFERRED EMBODIMENTS

Figure 1:
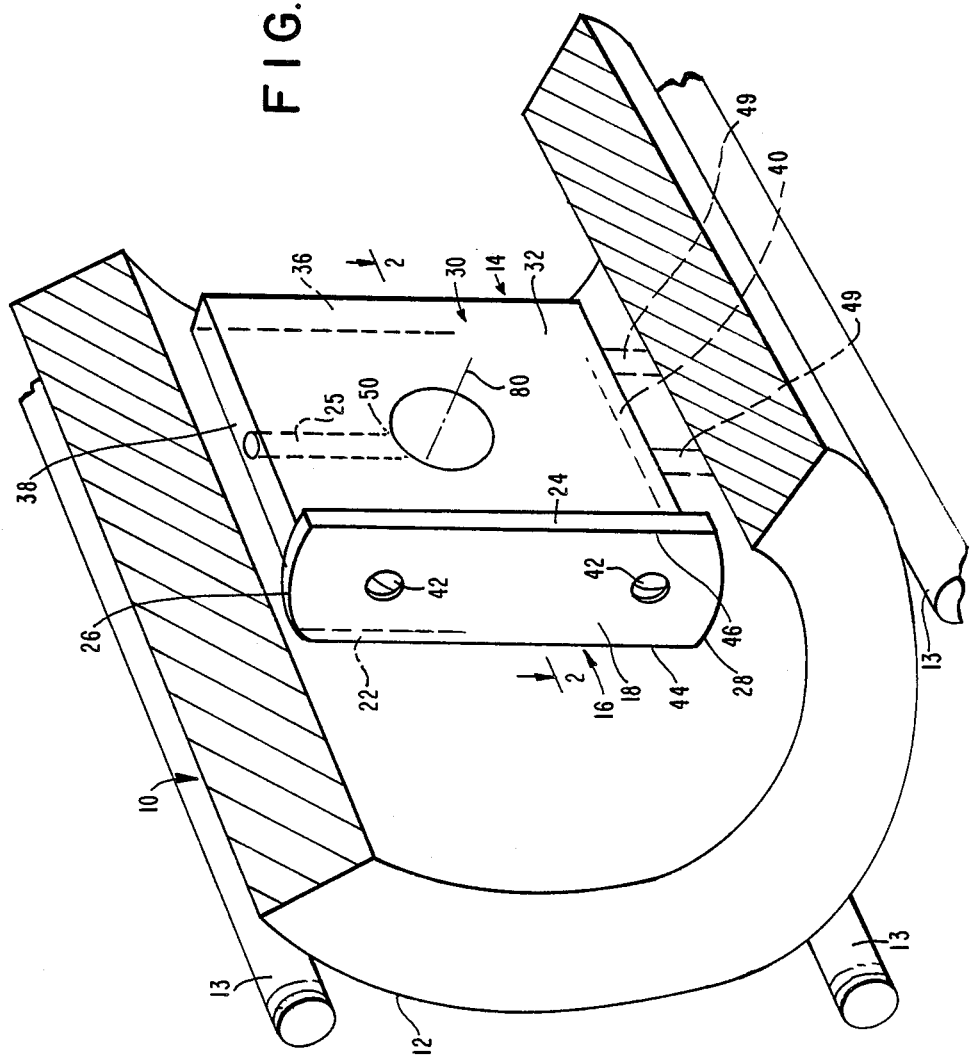
FIG. 1 is a schematic perspective view of a meter according to one embodiment of the present invention, with portions removed for clarity of illustration.

A meter according to one embodiment of the present invention includes a metallic casing in the form of a pipe 10 having an exterior surface 12 dimensional to fit within the space defined by bolts 13 connected between two ordinary pipe flanges, so that pipe 10 can be connected in an ordinary fluid pipeline. A body 14 is also provided. The body includes a platelike metallic vortex generating element 16 having a flat front major face 18 and a flat rear major face 20 parallel to the front major face. The vortex generating element also has two flat minor faces 22 and 24 bounding the major faces 18 and 20 on laterally opposite sides thereof and extending parallel to one another between the two major faces. Thus, vortex generating element 16 is substantially rectangular in cross section and has sharp edges at the intersections of its major and minor faces. Vortex generating element 16 is elongated and has two arcuate end surfaces 26 and 28 extending between minor faces 22 and 24. The radii of end surfaces 26 and 28, and the distance between these end surfaces are selected so as to conform with the interior radius of pipe 10.

A finlike metallic tailpiece 30 projects rearwardly from the rear major surface 20 of vortex generating element 16. Tailpiece 30 has two flat side surfaces 32 and 34 facing generally in opposite lateral directions. Thus, side surface 32 faces laterally outwardly towards minor face 24 of the vortex generating element (to the left in FIGS. 2 and 3), whereas side surface 34 faces laterally outwardly towards minor face 22 of the vortex generating element (to the right in FIGS. 2 and 3). Tailpiece 30 also has a flat, rear minor face 36 remote from vortex generating element 16. The side surfaces 32 and 34 slope slightly towards one another in the rearward direction, so that the lateral distance A between these two side surfaces at rear face 36 is slightly less than the lateral distance C between the same side surfaces at the juncture between tailpiece 3 and vortex generating element 16. Tailpiece 30 also has minor upper and lower surfaces 38 and 40. The upward to downward extent of the tailpiece, and hence the distance between surfaces 38 and 40 is selected so that the tailpiece will fit closely within the interior of pipe 10.

Vortex generating element 16 and tailpiece 30 are releasably secured to one another by a pair of flathead screws 42, the heads of the screws being countersunk in the front major face 18 of the vortex generating element. The threaded portions of screws 42 are received in tapped holes (not shown) extending forwardly and rearwardly within the forwardmost portion of tailpiece 30.

Figure 2:
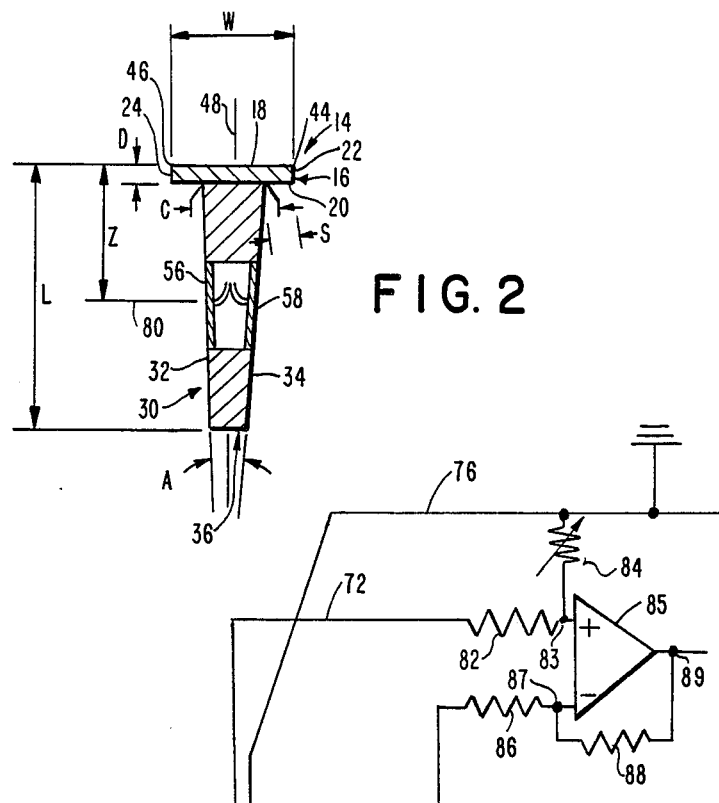
FIG. 2 is a sectional view taken along lines 2—2 in FIG. 1.

As best appreciated with reference to FIG. 2, the composite body 14 constituted by vortex generating element 16 and tailpiece 30 is generally T-shaped as seen in cross section. The front major face 18 of the vortex generating element defines a front face of the body, and the intersections of major face 18 with minor faces 22 and 24 define a pair of edges 44 and 46 bounding this front face. The body as a whole defines a lateral direction which is the direction between edges 44 and 46, a rearward direction from front face 18 to the edge 36 of the tailpiece remote from the front face. The forward direction defined by the body is opposite to the rearward direction. The body also defines upward and downward directions, which are the directions transverse to the lateral, forward and rearward directions. Body 14 also defines a theoretical medial plane 48 equidistant between side surfaces 32 and 34. As the body is substantially symmetrical with respect to medial plane 48, plane 48 is also equidistant between edges 44 and 46.

Body 14 is releasably secured within the bore of pipe 10 by a pair of set screws 49 (FIG. 1) engaged in corresponding pockets in the bottom minor surface 40 of tailpiece 30. When the body is secured within pipe 10 in this fashion, the medial plane 48 of the body 14 corresponds substantially to a diametral plane of the pipe bore, and the forward to rearward directions of the body are parallel to the axis of the pipe bore.

A hole 50 extends laterally through tailpiece 30, between side surfaces 32 and 34. Hole 50 is provided with counterbores 52 and 54 forming ledges at the intersections of hole 50 with the side surfaces. Two flat, circular, platelike piezoelectric elements 56 and 58 are mounted within hole 50. Piezoelectric element 56 has two opposed major surfaces 60 and 62. A thin metallic diaphragm 64 is bonded to major surface 60 and electrically connected thereto. Diaphragm 64 is also secured to tailpiece 30, so that the diaphragm 64 lies slightly recessed or substantially flush with side surface 32 and electrically connects major surface 60 to tailpiece 30. Piezoelectric element 58 likewise has two major surfaces 66 and 68, and there is a thin flexible metal diaphragm 70 bonded to major surface 68 of element 58. Diaphragm 70 is set within counterbore 54 and secured to tailpiece 30 so that the diaphragm is slightly recessed or flush with side surface 34 of the tailpiece. Diaphragm 70 thus electrically connects major face 68 of element 58 to the tailpiece.

An epoxy composition 72 substantially fills the space within hole 50 between piezoelectric elements 56 and 58. Electrically conductive, insulation-sheathed lead 72 is connected to major surface 62 of piezoelectric element 56, whereas a similar electrically conductive, insulation sheathed lead 74 is connected to major surface 66 of piezoelectric element 58. Leads 72 and 74 extend through the epoxy filler material 72 in hole 50 and extend upwardly through a lead bore 75 (FIG. 1) from within hole 50 to the upper minor surface 38 of tailpiece 30. Leads 72 and 74 extend out of pipe 10 through a hole (not shown) in the wall of the pipe, this hole being sealed by a sealing compound (not shown). A common lead 76 is electrically connected to pipe 10 As pipe 10 is electrically connected to tailpiece 30, common lead 76 is electrically connected to the tailpiece, and hence connected via diaphragms 64 and 70 to the major surfaces 60 and 68 of piezoelectric elements 56 and 58, respectively.

Figure 3:
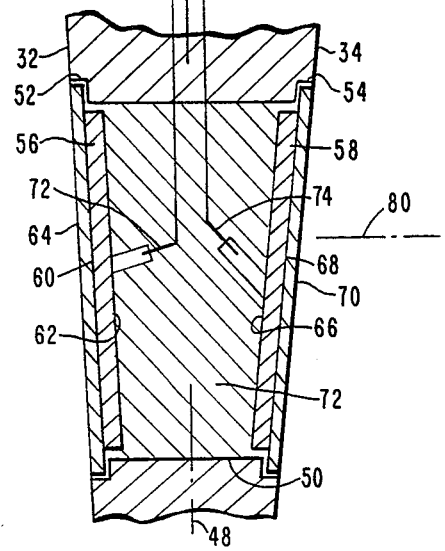
FIG. 3 is a composite view showing a portion of the region shown in FIG. 2 on an enlarged scale, together with certain additional elements in schematic block diagram form.

Each piezoelectric element 56 and 58 is an elastic body arranged to develop electrical potentials between its major surfaces when it is deformed. This electrical potential varies in accordance with the degree of deformation and hence with the force applied to the piezoelectric element. As will be appreciated by those skilled in the art, such piezoelectric elements can develop appreciable electrical potentials even where the deformations involved are quite small. Major surface 62 of piezoelectric element 56 constitutes the positive pole of the piezoelectric element. When a force directed towards the right in FIG. 3 is applied to element 56 bowing the element towards major surface 62, the electrical potential at pole 62 becomes progressively more positive with respect to the electrical potential at the opposite pole 60. Thus, the potential applied to lead 72 will become progressively more positive with respect to the potential of tailpiece 30 and common lead 76. Likewise, major surface 66 is the positive pole of piezoelectric element 58. The potential on lead 74 will become progressively more positive with respect to the potential at major surface 68, and hence progressively more positive with respect to the potential on common lead 76, as piezoelectric element 58 is urged toward pole 66, (to the left in FIG. 3). Forces and deformations in the opposite sense will cause opposite variations in the relative potentials between the various leads.

As best appreciated with reference to FIGS. 2 and 3, the flat, platelike piezoelectric elements 56 and 58 are mounted so that their major surfaces face substantially laterally. Piezoelectric element 56 is exposed to the fluid pressure prevailing at side surface 32 of tailpiece 30, whereas piezoelectric element 58 is exposed to the fluid pressure prevailing on side surface 34. More particularly, each piezoelectric element is exposed to fluid pressure prevailing in a predetermined sensing region of the associated side surface. The sensing regions are the regions of the side surfaces encompassed by hole 50. The centers of area of these sensing regions lie on a common lateral axis 80.

Common lead 72 is connected to ground. Lead 72 is connected through an input resistor 82 to a node 83 which in turn is connected via a potentiometer or variable resistor 84 to common or ground lead 76. Node 83 is also connected to the positive input terminal of an operational amplifier 85. Lead 74 is connected through a further input resistor 86 to a node 87. A feedback resistor 88 is coupled between the output node 89 of operational amplifier 85 and node 87. Node 87 is connected to the negative input of amplifier 85. In this arrangement, potentiometer 84 attenuates the signal from piezoelectric element 56. The degree of this attenuation or negative gain can be varied by adjusting the potentiometer. The output of amplifier 85 will be a composite signal representing the difference between the signal from element 56 (as attenuated) and the signal from element 58.

In use, pipe 10 is connected in a piping system, and a fluid is directed through the piping system and through pipe 10 so that fluid moving downstream moves rearwardly with respect to body 14. Thus, the moving fluid first encounters vortex generating element 16 and passes rearwardly, beyond the vortex generating element on both sides of tailpiece 30. Some of the moving fluid impinges on the front surface 18 of the body. Vortices are created and shed at the lateral edges 44 and 46 of the front surface. These vortices pass downstream or rearwardly on opposite sides of tailpiece 30. Because the vortices are shed substantially alternately from edges 46 and 48, the vortices will pass in alternating fashion on opposite sides of tailpiece 30. As a vortex passes along to one side of the tailpiece past axis 80, the fluid pressure on piezoelectric element 56 will increase momentarily, whereas the fluid pressure on the opposite side surface and on piezoelectric element 58 will momentarily decrease. Thus, both the piezoelectric elements 56 and 58 will tend to deform in the same lateral direction, to the right as seen in FIG. 3. The signal on lead 72, and hence at node 83 will increase whereas the signal at lead 74 will decrease. Both of these changes tend to make the composite or difference output amplifier 85 increase and hence both of these changes reinforce one another. Where a vortex passes along the other side surface of the tailpiece, the pressure changes, deformations of the piezoelectric elements, and changes in electrical potentials are reversed, so that the changes again reinforce one another, but in this case the composite output at output of amplifier 85 decreases. With continual streams of vortices passing in alternating fashion along opposite sides of the tailpiece, the composite output signal from amplifier 85 is alternately high and low. The frequency or period of this alternating potential is a measure of the speed with which vortices travel downstream and hence a measure of the fluid velocity or flow rate.

Pulsations or changes in the pressure prevailing within the interior of the piping system will tend to deform the piezoelectric elements in opposite directions rather than in the same direction. For example, a momentary increase in the pressure prevailing within the pipe will tend to bow both of the piezoelectric elements inwardly, towards medial plane 48 and hence will increase the potentials on both of leads 72 and 74. These effects will counteract one another. Thus, pressure fluctuations or pulsations will not tend to cause spurious fluctuations in the output signal from amplifier 85. Also, it has been found according to the present invention that noise propagated through the wall of pipe 10 also does not tend to cause spurious fluctuations of the composite output signal. Although the present invention is not limited by any theory of operation, it is believed that such noise may induce vibrations in the piezoelectric elements, but that these vibrations would be of substantially equal magnitude but opposite directions.

Gain or attenuation adjustment means 84 may be utilized to compensate for differences in response of the piezoelectric elements. Such differences may be caused, for example, by slight misalignment between the body and the flow field. For example, where the medial plane of body 14 is misaligned with the diametral plane of pipe 10, one or the other of the piezoelectric elements may interact to a greater degree with the vortices and may also interact to a greater degree with any possible pressure pulsations. Therefore, pressure pulsations may induce some change in composite output signal from amplifier 85, and hence may cause spurious velocity or flow readings. Gain adjustment 84 compensates for any such differential sensitivity. The gain adjustment preferably is adjusted so that pressure pulsations will produce equal changes in the signals at nodes 83 and 87, and hence will not alter the output of amplifier 85.

The proportions and dimensional relationships in the flowmeter according to preferred embodiments of the present invention contribute significantly to its performance. Desirably, the length or rearward extent L of the T-shaped body, measured from the lateral edges 46 and 44 of the forward face 18 to the rearmost face 36 of the tailpiece, is more than about 1 times and preferably about 2 to about 3 times the width W between the lateral edges 46 and 44 bounding the front face 18. Normally, edges 46 and 44 are parallel to one another. However, where these edges are not parallel, the average lateral distance between these edges should be taken as the width W of the front surface. L/W ratios greater than about 3 tend to cause turbulence which interferes with operation of the instrument. L/W ratios below about 1 are markedly less preferred because they tend to induce some degree of frequency variation, i.e., differences in the time delay between shedding of successive vortices. Also, L/W ratios greater than 1 provide better linearity, particularly at low fluid velocities. Thus, with L/W ratios more than 1 the ratio between fluid velocity and frequency of the output signal remains constant down to very low fluid velocities.

The ratio between the rearward distance Z from the edges 46 and 48 bounding front surface 18 to the centers of the sensing areas (to axis 80) and the width W of the front surface should preferably be between about 1 and about 3 and preferably about 1.2. Although Z/W ratios above 3 can be used where the length of the tailpiece permits, such high Z/W ratios tend to result in decreased sensitivity due to decay of the vortices before the same arrive at the piezoelectric elements.

The ratio of the thickness of the platelike element 16 to its width, i.e., the ratio (D/W) of the rearward extent D of each of minor surfaces 22 and 24 to the lateral extent W of the forward face 18 is preferably between about 1 and 0.03, and more preferably about 0.0625. The ratio (C/W) of the lateral extent or width of the tailpiece at its juncture with the rearward major face 20 of the vortex generating element (dimension C, FIG. 2) to the width W of the vortex generating element is preferably between about 0.67 and 0.25, and more preferably about 0.45. Thus, there is desirably a step of width (FIG. 2) on each side of the tailpiece at the rear face of the vortex generating element where S/W is about 0.167 to 0.375, and most desirably about 0.275.

The taper of tailpiece 30 significantly aids in reducing the sensitivity of the instrument to noise and pressure pulsations. Desirably, the angle A subtended between the side surfaces 32 and 34 of the tailpiece is between about 2° and about 12°, and most preferably about 3°.

As will be readily appreciated, numerous variations and combinations of the features described above can be utilized without departing from the present invention as defined in the claims. Merely by way of example, both leads 72 and 74 may be provided with variable attenuation potientiometers. The variable attenuation potientiometer 84 can be replaced by an amplifier with adjustable gain in series with lead 72, or by two such adjustable amplifiers, one in series with each of leads 72 and 74. Also, the signal processing means employed to merge the sensor outputs from the two piezoelectric elements need not include the amplifier 85 referred to above. The piezoelectric elements may be connected directly to one another, with the two positive poles 66 and 62 connected directly to one another. The potential between the two negative terminals 68 and 60 of the piezoelectric elements will represent a composite output, and the output of the individual piezoelectric elements will reinforce one another where the two elements deflect in the same direction but will tend to cancel one another when the two elements deflect in opposite directions. This composite output, when amplified, will provide a useful signal. However, this arrangement is less preferred as the gain cannot be adjusted individually for each piezoelectric element to compensate for misalignment, differences in sensitivity or the like.

The polarities of piezoelectric elements 56 and 58 can be reversed. Also, although the piezoelectric elements represent the most preferred form of sensors, other sensors can be employed. For example, the piezoelectric elements can be replaced by other deformable sensors such as diaphragms with bonded strain gauges, electret transducers, magnetostrictive transducers, capacitive transducers, optical transducers or the like. The tailpiece and vortex generating element may be formed integrally with one another rather than separately, and may be formed from nonmetallic materials such as plastics and ceramics. Although the T-shaped body utilized in the preferred embodiments discussed above is most definitely preferred, and provides superior results, other so-called "bluff body" shapes can be employed with the dual sensor arrangement discussed above. As these and other objects, features and advantages of the present invention can be utilized without departing from the present invention as defined by the claims, the foregoing description of the preferred embodiments should be taken by way of illustration rather than by way of limitation of the present invention as defined in the claims.

What is claimed is:

1. A fluid velocity meter comprising:
   (a) vortex generating element defining a forward face and a pair of lateral edges bounding said face;
   (b) a tailpiece disposed rearwardly of said vortex generating element, said tailpiece having two side surfaces facing generally in opposite lateral directions and including a hole extending laterally between said two side surfaces;
   (c) two separate sensors disposed in said hole;
   (d) a filler material disposed between said two separate sensors in said hole, wherein said filler material permits lateral movement of said two separate sensors relative to one another.
   (e) output means associated with each said sensor for producing a sensor output signal representing force applied to the sensor; and (f) means for mounting said sensors in spaced apart relationship in said hole in said tailpiece so that said sensors can operate substantially independently of one another and so that fluid pressures applied to said side surfaces urge said sensors in opposite lateral directions in said hole.

2. A meter as claimed in claim 1 further comprising signal processing means for merging the signals from said output means to form a composite output signal so that changes in said sensor output signals corresponding to forces applied to said sensors in the same lateral direction will reinforce one another and alter said composite output signal but changes in said sensor output signals corresponding to forces applied to said sensors in opposite lateral directions will oppose one another to thereby minimize alteration of said composite output signal.

3. A meter as claimed in claim 1 wherein said signal processing means includes variable gain means for applying a selectively variable gain to at least one of said sensor output signals prior to merging said sensor output signals.

4. A meter as claimed in claim 1 wherein each said sensor is generally platelike and defines opposed major surfaces, said mounting means including means for mounting said platelike sensors so that said major surfaces thereof face generally in said lateral directions.

5. A meter as claimed in claim 4 wherein said tailpiece and said sensors are substantially symmetrical about a medial plane normal to said lateral directions.

6. A meter as claimed in claim 4 wherein each said sensor is mounted to one of said side surfaces of said tailpiece.

7. A meter as claimed in claim 1 wherein each said sensor is a piezoelectric element having two poles, said meter including conductor means for supplying two separate electrical potentials, one such potential representing the force applied to each said piezoelectric element.

8. A meter as claimed in claim 7 wherein said conductor means includes a single common conductor and two isolated conductors, said common conductor being connected to a first pole of each of said piezoelectric elements, each said isolated conductor being connected to a second pole of only one of said piezoelectric elements, whereby the potential between each said isolated conductor and said common conductor represents the deformation of one of said piezoelectric elements.

9. A meter as claimed in claim 1 wherein said vortex generating element is substantially platelike and has oppositely directed front and rear major faces, said tailpiece projecting rearwardly from said rear major face of said vortex generating element so that said vortex generating element and said tailpiece cooperatively define a generally T-shaped body.

10. A meter as claimed in claim 9 wherein the ratio L/W is about 1 or more where L is the forward to rearward length of the body, from said edges to the rearmost portion of said tailpiece, and W is the lateral distance between said edges.

11. A meter as claimed in claim 10 wherein said ratio L/W is about 2 to about 3.

12. A meter as claimed in claim 10 wherein said mounting means is arranged to mount said sensors to said tailpiece so that each said sensor is exposed to forces applied by fluid pressure on a predetermined sensing area of one of said side surfaces, the centers of said sensing areas lying on a common lateral axis, the ratio Z/W being about 1 to about 3, where Z is the rearward distance from said edges to said common lateral axis.

13. A meter as claimed in claim 12 wherein said ratio Z/W is about 1.2.

14. A meter as claimed in claim 9 wherein said side surfaces of said tailpiece slope towards one another in the rearward direction.

15. A meter as claimed in claim 14 wherein said platelike vortex generating element has two lateral minor faces extending substantially forwardly and rearwardly and substantially parallel to one another, said minor faces extending from said front major face to said rear major face.

16. A meter as claimed in claim 9 wherein said tailpiece is formed separately from said platelike vortex generating element, said meter further comprising means for releasably connecting said vortex generating element to said tailpiece.

17. A meter as claimed in claim 1 further comprising means for directing a flowing fluid in a downstream direction so that at least a part of the flowing fluid impinges on said vortex generating element.

18. A meter as claimed in claim 17 wherein said means for directing includes a pipe and means for securing said vortex generating element and tailpiece within said pipe.

19. A fluid velocity meter comprising:
(a) vortex generating element defining a forward face and a pair of lateral edges bounding said face;
(b) a tailpiece disposed rearwardly of said vortex generating element, said tailpiece having two side surface facing generally in opposite lateral directions and including a hole extending laterally between said two side surfaces;
(c) two separate generally plate-like piezoelectric elements disposed in said hole, said piezoelectric elements defining opposed major surfaces;
(d) output means associated with each said piezoelectric element for producing a piezoelectric element output signal representing force applied to the piezoelectric element, said output means including conductor means for making electrical connection to the major faces of each said piezoelectric element, said conductor means including an electrically conducted diaphragm bonded to one of the major faces of the piezoelectric element; and
(e) means for mounting said piezoelectric elements in spaced apart relationship in said hole in said tailpiece so that said diaphragms face outwardly, away from one another in said opposite lateral directions and so that said piezoelectric elements can operate substantially independently of one another and so that fluid pressure applied to said side surface urge said piezoelectric elements in opposite lateral directions in said hole.

20. A meter as claimed in claim 19 wherein said tailpiece is electrically conductive and each said diaphragm is electrically connected to said tailpiece, whereby said tailpiece serves as a common electrical connection to one major face of each of said piezoelectric elements.

21. A meter as claimed in claim 19 further comprising means for directing a flowing fluid in a downstream direction so that at least a part of the flowing fluid impinges on said vortex generating element.

22. A meter as claimed in claim 21 wherein said means for directing includes a pipe and means for securing said vortex generating element and tailpiece within said pipe.

* * * * *